United States Patent [19] [11] Patent Number: 4,899,460
Kang [45] Date of Patent: Feb. 13, 1990

[54] TAPE MEASURING RULER BRAKE

[75] Inventor: Dong M. Kang, Seoul, Rep. of Korea

[73] Assignee: Korea Measures Co., Ltd., Busan, Rep. of Korea

[21] Appl. No.: 221,315

[22] Filed: Jul. 19, 1988

[30] Foreign Application Priority Data

Jul. 21, 1987 [KR] Rep. of Korea ............. 11868/87[U]

[51] Int. Cl.⁴ .............................................. G01B 3/10
[52] U.S. Cl. .................................... 33/767; 242/107.3
[58] Field of Search .................... 242/84.8, 107.2, 761, 242/107.3; 33/767

[56] References Cited

U.S. PATENT DOCUMENTS

| 3,164,907 | 1/1965 | Quenot | 33/138 |
| 4,288,923 | 9/1981 | Duda | 33/138 |
| 4,449,302 | 5/1984 | Drechsler | 33/138 |
| 4,489,494 | 12/1984 | Duda | 33/138 |
| 4,765,557 | 8/1988 | Kahmann | 242/107.3 |

Primary Examiner—William A. Cuchlinski, Jr.
Assistant Examiner—Christopher W. Fulton
Attorney, Agent, or Firm—Jordan B. Bierman

[57] ABSTRACT

An improved stopping device for a measuring tape in a tape ruler over known tape rulers, which is structured and operates with only a simple pressing button, whereas conventional tape rulers have several parts. A pressing button 3 with an empty cavity 4, movable friction stopper 5, slit 6, protruding core bar 7, and coil spring separately form the ruler with a measuring tape 2 which is taken into the cavity through the slit and the spring is placed on the spring base plate 9. The measuring tape 2 can be stopped by the two stoppers, or released by pressing the pressing button 3.

1 Claim, 2 Drawing Sheets

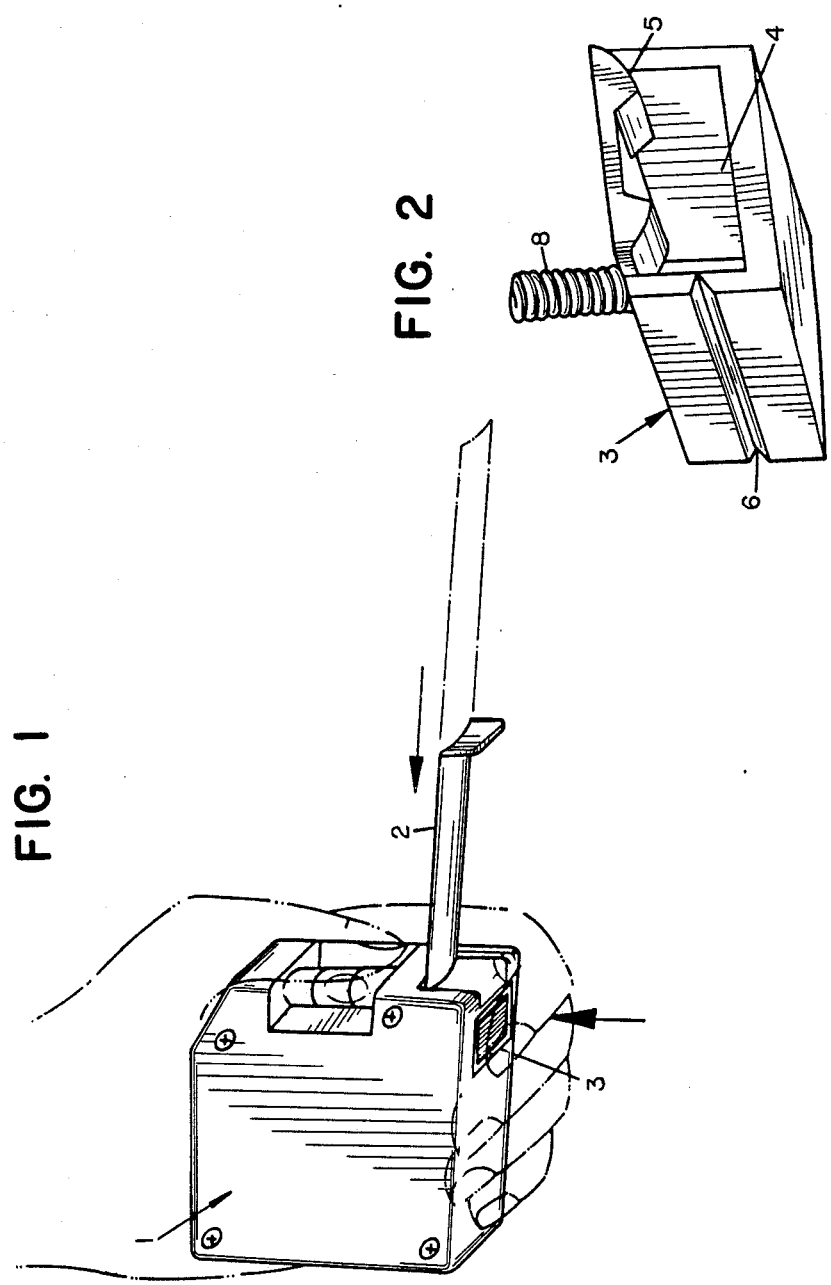

TAPE MEASURING RULER BRAKE

STATE OF THE ART

Conventionally, a few stopper devices for the measuring tape of a tape ruler applied for the similar purposes are well known. However, these stopper devices are generally constructed with a stopping piece for the measuring tape which may be operated in connection with a pressing button by some connecting means such as a cam or the like, and the pressing button is mounted with a center pivot at the middle portion of the outlet side surface of the tape ruler case. Though these stopper devices may be operated so that the stopping piece grasps the measuring tape when a side end of the pressing button is pressed and that the measuring tape is released from the stopping piece when another side of the pressing button is pressed, these structures have some disadvantages in that the assembly process is cumbersome and inconvenient because of the numbers of the parts connected to each other are many. Especially disadvantageous is that not only the external appearance is not neat because the pressing button protrudes from the top surface or front surface of the tape ruler case, but also the manufacturing costs are increased.

OBJECTS OF THE INVENTION

An object of the invention is to solve the above disadvantages and to provide a measuring tape ruler in which the stopping operation of the measuring tape is simple and convenient, and the external appearance is neat by mounting the pressing button at the front end of the bottom surface of the tape ruler case.

Another object of the invention is to provide a measuring tape ruler in which the correct action is ensured constantly without any possibilities of damage by forming a very simple structure with a short distance between the pressing button and measuring tape.

A further object of the invention is to provide a measuring tape ruler in which the manufacturing costs are greatly reduced by constructing it with less parts and a simple mechanism but correct action.

These and other objects and advantages of the invention will become obvious from the following detailed description.

THE INVENTION

The novel measuring tape ruler of the invention wherein the measuring tape can be automatically rolled up by the resilient force of a spring connected with the rear end of the measuring tape, and the pulled out measuring tape can be stopped by releasing the pressing button to activate the stopper means at the outlet of the tape ruler case comprises forming the pressing button at the front end of the bottom surface which is urged outwardly with a coil spring, and integrally forming the friction stopper means at an opposite upper side end of this pressing button. Therefore, the measuring tape may be pulled out as much as required to measure certain articles by pressing the pressing button, which is then released to stop the pulled out measuring tape at the time when the appropriate length of the measuring tape is obtained. When the measurement is completed, the pressing button may be pressed again to retract the pulled out measuring tape into the tape ruler case.

Referring now to the drawings:

FIG. 1 is a perspective view of an embodiment of the invention in operating condition.

FIG. 2 is a magnified perspective view of the stopping means of the invention.

FIGS. 3A and 3B are front elevational and cross sectional views which is partly removed illustrating the operational conditions of the present invention in which:

FIG. 3A shows the condition of the measuring tape being stopped with the pressing button released and FIG. 3B shows the condition of the measuring tape being released when the pressing button pressed.

DETAILED DESCRIPTION OF THE INVENTION

Figure 3A:
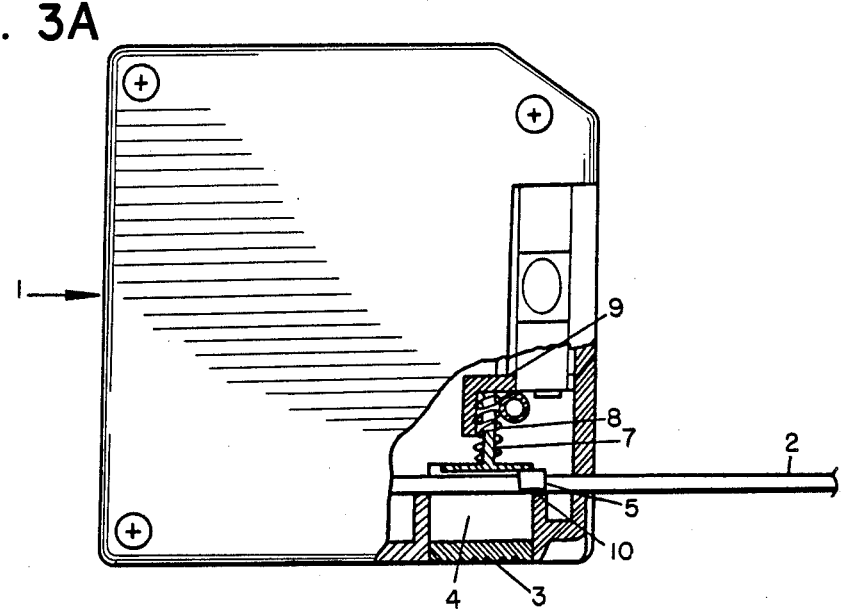

The present invention will be described in detail with reference to the accompanying drawings, and the similar reference numbers in different figures denote the same element unless otherwise specified.

In FIGS. 1 to 3B, the measuring tape ruler case with body 1 contains the measuring tape 2 in the rolled up condition and a pressing button 3 is mounted at the front end of the bottom surface of a tape ruler body or case 1. The pressing button 3 which is shaped as a square box has an empty cavity 4, a movable friction stopper 5 formed integrally at the upper end of the pressing button and a slit 6 is formed longitudinally at a side surface to allow the measuring tape 2 to pass through into the empty cavity 4 during assembly. A coil spring 8 is inserted on the protruding core bar 7 which is integrally formed at the center of the top surface of the pressing button and the coil spring 8 is mounted to the spring base plate 9 forming a portion of the tape ruler body 1, and thus the stopping device is arranged. The counter steady friction stopper 10 forms a part of the tape ruler body 1 so as to cooperate with the movable friction stopper 5 of the pressing button 3.

The operation and the effectiveness of the invention constructed as described above will be explained as follows: The measuring tape 2 contained within the ruler body 1 is taken into the empty cavity through a slit 6 formed at a side surface of the pressing button 3. A coil spring 8 which is inserted on the protruding core bar 7 located at the center of the top surface of a pressing button 3 has to be mounted on the spring base plate 9 within a tape ruler body 1 and then the case of the tape ruler body 1 may be assembled completely. When the measuring tape ruler is completely assembled, the measuring tape 2 is stopped by being sandwiched between the movable friction stopper 5 of the pressing button 3 and the counter steady friction stopper 10 within the tape ruler body 1 whereby the measuring tape 2 is tightly held in position.

Figure 3B:
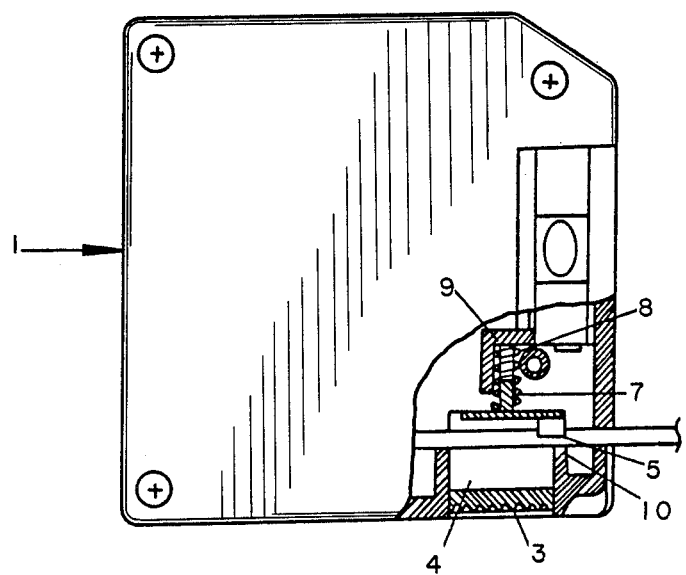

When the measuring tape 2 is required to be pulled out of or rolled back into the tape ruler body 1, the pressing button 3 is pressed with a finger of a hand as illustrated in FIG. 1 and the measuring tape 2 may be pulled out with another hand as long as one needs to measure an article, or rolled back rapidly into the ruler body by the resilient force of the internal spring if the measuring tape 2 is released from the other hand, because the measuring tape 2 is then free to move through the space which occurs between the movable friction stopper 5 and the counter steady friction stopper 10 by the lifting up of the movable friction stopper 5 of the pressing button 3 by pressing it for compressing the coil spring 8, as as illustrated in the change of position from FIG. 3A to FIG. 3B.

In the present invention as described above wherein the pressing button 3 is formed with very simple but accurate mounting at the immediate front of the in-and-outlet opening on the button surface of a tape ruler body 1, it has the advantages that the external appearance can be neat, and the assembly is extremely easy due to the simplicity of the mechanical structure. Accordingly, the manufacturing costs are greatly decreased, and the possibility of damage seldom or never arises but the operation is always accurate.

Various modifications of the ruler of the invention may be made without departing from the spirit or scope thereof and it is to be understood that the invention is intended to be limited only as defined in the appended claims.

What is claimed is:

1. In a measuring tape ruler containing a rolled up measuring tape within a tape ruler case body, a measuring tape stopping means of the measuring tape ruler comprising:
   a pressing button formed with a rectangular square box having an empty cavity therein;
   a moveable friction stopper formed at the upper end integral of the said pressing button;
   a slit formed longitudinally at the middle portion of a side surface of the said pressing button, through which the measuring tape passes into the empty cavity;
   a protruding core bar on which a coil spring is to be inserted;
   said pressing button being mounted at the front end portion immediately adjacent of the opening of the tape ruler case body whereby the coil spring is mounted to the spring base plate which is a part of the tape ruler body;
   a counter steady friction stopper formed integrally at the position immediately beneath the movable friction stopper as a part of the tape ruler body so that the measuring tape passes between the two stoppers; and
   said pressing button is assembled completely with measuring tape within the measuring tape ruler body.

* * * * *